W. WARREN.
Bee Hive.

No. 38,431.

Patented May 5, 1863.

Witnesses
J. W. Coombs
G. W. Reed

Inventor
Waters Warren
per Munn & Co.
attorneys

UNITED STATES PATENT OFFICE.

WATERS WARREN, OF THREE OAKS, MICHIGAN.

IMPROVEMENT IN BEE-HIVES.

Specification forming part of Letters Patent No. 38,431, dated May 5, 1863.

*To all whom it may concern:*

Be it known that I, WATERS WARREN, of Three Oaks, in the county of Berrien and State of Michigan, have invented a new and Improved Bee-Hive; and I do hereby declare that the following is a full, clear, and exact description of the same, reference being had to the accompanying drawings, making a part of this specification, in which—

Figure 1:
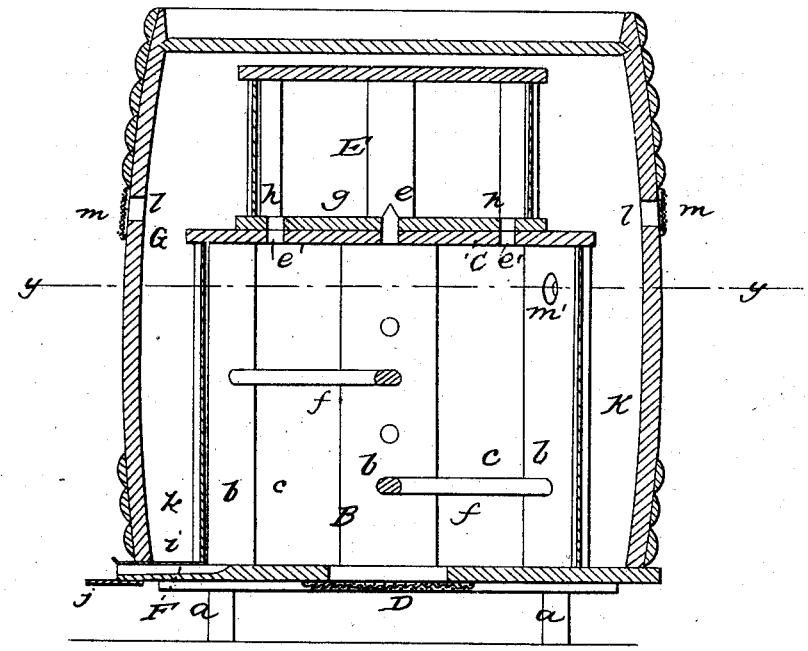
Figure 2:
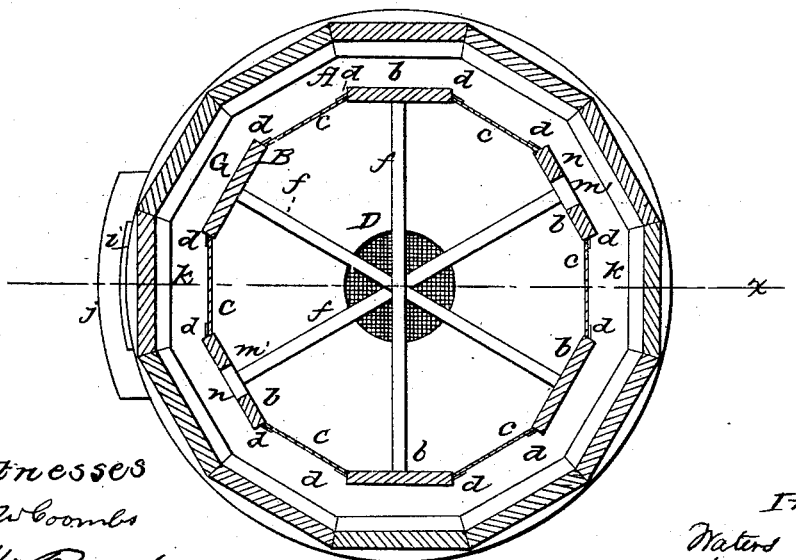

Figure 1 is a vertical central section of my invention, x x, Fig. 2 indicating the plane of section; Fig. 2, a horizontal section of the same, taken in the line y y, Fig. 1.

Similar letters of reference indicate corresponding parts in the two figures.

The object of this invention is to obtain a bee-hive which will be extremely simple in construction, economical to manufacture, admit of having honey readily taken from it, and possesses other advantages hereinafter enumerated.

The invention consists in constructing the body of the hive in polygonal form and of alternate sides of glass and wood, the body of the hive being secured to a suitable platform, and the former having a spare-honey box similarly constructed and placed upon the body or main portion of the hive, and arranged in such a manner that it may turn and admit of holes, which are made in the top of the body of the hive and the bottom of the spare-honey box, being brought in line with each other, or cut off from each other, so as to afford a communication between the two parts above mentioned, or admit of said parts being cut off from each other, as may be required. With these parts there is used a cap or cover, which incloses them fully, and serves to keep the hive at a uniform temperature.

To enable those skilled in the art to fully understand and construct my invention, I will proceed to describe it.

A represents the platform, which may be of circular or other proper form, and of any suitable dimensions. This platform is supported at a suitable height by legs a, and upon the platform the body or main portion B of the hive is secured. This body or main portion B is of polygonal form, and is composed of alternate sides of wood and glass b c, the glass c being secured between b by glaziers' brads d. The top C of the body B is composed of a horizontal circular piece of board, secured to the wooden sides b, and said top has a vertical pin, e, fitted centrally to it, and the top also has a series of holes, e', made through it in the form of a circle. The body B has a number of horizontal rods, f, fitted in it to support the combs, and the platform A has a hole made through it in line with the center of the hive, for the purpose of ventilating the same, said hole being provided or covered with wire-gauze D, which is removed when necessary to admit a swarm of bees into the hive. On the top C of the body B of the hive there is placed a spare-honey box, E, which is constructed similarly to the body B, and has its bottom g provided with holes h, placed or arranged in the form of a circle equal in diameter to the circle of holes e' in the top C of the body B of the hive. The pin e of the top C of the body B of the hive fits into a hole made in the center of the spare-honey box E, the pin e serving as a center for the box to turn around. By turning the box E, the holes e' h of the top C and bottom g may be made to register with each other, so as to form a communication between B and E for the bees to pass from one to the other, and said openings, by turning the box E, may also be cut off from each other, so as to close the communication between the two parts B E.

F is the bee entrance or passage, which is formed in the upper surface of the platform A, and is covered by a metal plate, i'; and to the under side of the platform, directly below said entrance, there is attached a plate, j, which projects beyond the edge of the platform and serves as an alighting-board for the bees.

G represents the cap or cover for the hive and spare-honey box. This cap or cover is simply an ordinary barrel, of sufficient dimensions to admit of a space, k, extending all around the sides and top of the hive, as shown in Fig. 1. The cap or cover is provided with ventilating-openings l at its upper part, said openings being covered with wire-gauze m. Ventilating-openings m' are also made in the wooden sides b of the body B, said openings being covered with wire-gauze n.

The advantages of the hive thus constructed are as follows: First, it is adapted to the round shape of a swarm of bees, no vacant corners for insects or mice to operate in; second, simplicity of construction—almost any person can make one, especially if provided with the glass cut of proper dimensions; third, the small cost of construction; fourth, during extreme heat, when bees in ordinary hives cease to work and cluster on the outside, bees in this hive will remain at work, thereby collecting more honey, and during the winter a sufficiently high temperature is obtained to favor the early breeding of the bees, and consequently early swarming; fifth, the facility with which honey can be taken from either the body or spare-honey box of the hive, any of the glass sides being removed and replaced with ease; sixth, it is easily managed, and may be placed in any desired locality, either in summer or in winter; seventh, it may be transported or conveyed from place to place, the bee-entrance being required to be closed, the ventilating-holes being left open; eighth, facility for inspecting the interior of the hive, all that is required to effect this being the removal of the cap or cover G.

Having thus described my invention, what I claim as new, and desire to secure by Letters Patent, is—

1. The body B and spare-honey box E, constructed of alternate sides of wood and glass, and arranged in polygonal form, in combination with the cap or cover G and platform A, substantially as described.

2. The manner of arranging or applying the spare-honey box E to the body B of the hive—to wit, by fitting the box E on a central pivot or pin, $e$, when said box E is provided with holes $h$ in its bottom $g$, and the top C of the body B is provided with similar holes, $e'$, as and for the purpose specified.

WATERS WARREN.

Witnesses:
  THOMAS C. BRADLEY,
  HENRY CHAMBERLAIN.